United States Patent Office 3,433,593
Patented Mar. 18, 1969

3,433,593
PROCESS FOR PRODUCING FINELY-DIVIDED PRECIPITATED SILICA
Helmut Reinhardt, Frankfurt am Main, and Peter Nauroth, Wesseling Bezirk Cologne, Germany, assignors to Deutsche Gold- und Silber-Scheideanstalt vormals Roessler, Frankfurt am Main, Germany a corporation of Germany
No Drawing. Filed June 24, 1966, Ser. No. 560,114
Claims priority, application Germany, July 2, 1965, D 47,633
U.S. Cl. 23—182    5 Claims
Int. Cl. C01b 33/18

ABSTRACT OF THE DISCLOSURE

Finally divided precipitated silica produced from water glass with mineral acid having a large specific surface area, low iron content, slight sedimentation and low viscosity is provided by precipitation at an acidic pH below 5 in the presence of substances which form soluble complex compounds with iron such as the combination of an inorganic fluoride and an organic acid, alcohol or the amides and amines thereof. Because of their unique combination of properties and especially their low iron content, such silicas are especially useful in coatings for reproduction papers. Favorable viscosity characteristics are obtained by grinding the silicas in a gas or jet mill subsequent to precipitation.

---

The invention relates to a process for producing finely-divided silica precipitated from a water glass solution with mineral acid, said silica having a large specific surface area, a low iron content, a slight sedimentation and a low viscosity in an aqueous suspension.

It is known to use silica as a coating agent for paper materials, whereby silicas with certain definite properties are successfully used in accordance with the purpose to which the coated papers will be put. Thus, silicas of a special type are required for coating photographic and blueprint papers in reproduction technology. The silica-containing layer should equalize roughness in the paper surface. It should also prevent coloring components, for example, an azo compound from penetrating the paper (due to the absorption effect of the cellulose fibers) thereby making it optically ineffective.

However, for the application of the silica coating agent on the papers, it is necessary that the silica remain suspended in the aqueous suspension provided with suitable binders, such as starch, casein and synthetic dispersions. Furthermore, said suspension should be sufficiently fluid that as much as possible of the organic coloring agent is adsorbed by the silica surface upon contact with the reproduction paper of the agent.

However, since even small amounts of iron cause fading of the light-sensitive layer and thus make the papers useless, a silica with a low content of iron and iron compounds is also required (approximately 2 to 2.5 milligrams per 100 grams silica). Commercial silicas, precipitated from water glass with mineral acids in the traditional way, have iron contents of 20 to 100 milligrams Fe per 100 grams silica because the raw materials used in their production contain iron. These silicas are practically worthless for use for the aforesaid purpose. The silicas which are on the market and which were obtained progenically by hydrolysis of silicon halide compounds in the vapor phase do have a low iron content. However, their viscosity behavior is not satisfactory. As the result of too great a fineness, they produce a too viscous, aqueous suspension, whereby the uniform coating on the paper is impaired. Moreover, the production costs of said silicas as coating materials, which are generally used only for special purposes, are too high.

According to the present invention, there is provided a process for producing finely-divided, precipitated silica from a water glass solution with mineral acid, e.g., HCl, $HNO_3$, $H_2CO_3$, $H_2SO_4$, etc. By means of said process there is obtained a product with a large specific surface area, a low iron content, a slight sedimentation and a low viscosity in an aqueous suspension. By virtue of these special characteristics, the silicas produced by the practice of this invention are suitable for coating reproduction papers. In addition to almost complete freedom from iron, the silicas of this invention possess large specific surface areas which result from the small primary particles (approximately 10 mmicrons) which form during precipitation. However, the agglomerated secondary particles of the finished powder are sufficiently small that they remain in aqueous suspension rather than settling out as sediment. On the other hand, they are not so small (<500 mmicrons) that they form a suspension so viscous that it impedes a uniform coating.

In the practice of the invention, the precipitation is conducted from water glass solutions in a strongly acid pH range, preferably at pH of about 1.5 to about 2.5, and in the presence of substances which form soluble complex compounds with iron. Suitable complexing substances include mixtures of compounds of fluorine, notably inorganic fluorine compounds such as hydrofluoric acid and sodium fluoride in combination with monovalent or multivalent organic acids and alcohols, inclding the amides and amines thereof. Tartaric acid, citric acid, oxalic acid, glycerine, ethylene glycol and ethylene diamine tetra-acetic acid sodium, etc., have proved especially effective. A combination of 4 parts by weight of sodium fluoride and 1 part by weight oxalic acid per 100 parts silica has resulted in a low iron content of about 2 to about 3 milligrams Fe per 100 grams silica. The quantity of complex formers required is variable depending mainly on the quantity of iron in the suspension.

According to one embodiment, the complex formers are dissolved in a prior art base solution in a reaction vessel. The reaction components, water glass and acid solution are added to the base solution simultaneously at different places in the vessel at temperatures of 85–95° C. in accordance with well known commercial practice and in a strongly acid pH range below about 5, preferably about 1.5–2.5. In this way, a silica with a large BET surface (>300 m./g. in the case of primary particles of approximately 10 millimicrons) and a low iron content (approximately 2–2.5 mg. Fe/100 g. $SiO_2$) is obtained.

A silica produced in the above-described way is practically free of iron and has a high adsorptive power. However, when suspended in water or a water-containing medium, it tends to form a sediment as the result of too great an agglomeration of the secondary particles. When used for papers as a coating agent, the silica must remain suspended in the aqueous suspension as has already been stated.

It has been found that the silica produced according to the precipitation process of the invention can be greatly improved with respect to its suspension behavior if it is ground in a gas or steam jet mill. In Example 3 which follows, the differences in the sedimentation behavior of a silica ground on standard mills and a type which was reduced to a much finer degree of fineness on the preferred gas or steam jet mills are shown.

The suitability of a silica, which has been produced according to the invention's precipitation process and was ground on a steam jet mill for coating paper is illustrated by the comparison given below. Characteristic physical and chemical data for a silica obtained by a pyrogenic method and for a silica gel precipitated in the standard way are also reported for comparison.

| Measuring values | Pyrogenic silica | Precipitated silica | Silica precipitated according to the invention's process and ground with the gas or steam jet mill |
|---|---|---|---|
| (1) Primary particle size determined electron optically. | 20 mmicrons | 10 mmicrons | 10 mmicrons. |
| (2) Specific surface area according to BET. | 16–200 m.² g | 320 | 380. |
| (3) Secondary particle size. | Approx. 100 mmicrons. | 500–1000 mmicrons. | 500–1000 mmicrons. |
| (4) Viscosity in seconds for passage of the aqueous 5% suspension into the Ford beaker. | 100 seconds | 20 seconds | 20 seconds. |
| (5) Fe content in mg./ 100 g. SiO₂. | 2–3 | 12–18 | 2–9. |

The comparisons show that the silica precipitated according to the precipitation process of this invention and ground in a gas or steam jet mill combines the low iron content of silica obtained by a pyrogenic method with the favorable viscosity behavior of a precipitated silica. Moreover, it is produced from the inexpensive raw materials water glass and mineral acid by a simple precipitation process and therefore is most suitable for coating reproducing paper.

EXAMPLE 1(a)

18.5 liters of water are placed in a cylindrical wooden tank which holds 30 liters and which is provided with a wooden flat paddle mixer, diameter 20 cm., height 6 cm., 90 r.p.m. The water is heated indirectly with a steam coil of acid-resistant steel to 85° C. 25 grams of sodium fluoride and 6.25 grams of oxalic acid are dissolved in the base solution.

Then 5.45 liters of commercial soda water glass, molar ratio $Na_2O:SiO_2=1:3.36$, density 1.34, 26% $SiO_2$ content, and approximately 1 liter of sulfuric acid 98% $H_2SO_4$ are introduced within 90 minutes at opposite points during stirring and with the maintenance of a pH value of 2.0.

The forming suspension is stirred for an additional 30 minutes. The suspension is filtered on a suction filter with double the amount of water as related to the volume of the suspension. The filter cake is rinsed, dried at 105° C. and, if desired, ground in a disk attrition mill.

2000 grams of a powdered silica with a bulk weight of 180 grams per liter and a BET surface of 425 M.²/g. are obtained. The iron content is 2.5 milligrams Fe/100 grams silica.

EXAMPLE 1(b)

A process comparable to that in Example 1(a) is carried out. However, only 10 grams sodium fluoride are added to the base solution, whereby the silica which is obtained has an iron content of 16.5 milligrams per 100 grams silica.

EXAMPLE 1(c)

The process is the same as in Example 1(a); however, a pH value of 5.0 is maintained during the precipitation. The iron content of the resulting silica is 27 milligrams per 100 grams.

EXAMPLE 2(a)

13.5 grams tartaric acid were added to the water base solution according to Example 1. Water glass and acid were introduced at 95° C. in 237 minutes with the maintenance of a pH value of 2–2.2 for the suspension. The obtained powdery silica had an iron content of 9.4 milligrams per 100 grams and a BET surface of 608 m.²/g.

EXAMPLE 2(b)

Example 2(a) was repeated but without the addition of tartaric acid. The thus obtained silica had an iron content of 16 milligrams per 100 grams.

EXAMPLE 3(a)

A silica produced according to Example 1 was ground in a jet mill of the Jet-O-Mixer type with superheated steam at a steam temperature of 300° C. and a steam pressure of 14 atmospheres excess pressure. 5 grams of the thus ground silica were suspended in 100 milliliters distilled water in a period of 30 seconds during mixing with a propeller mixer. The suspension was in a polyethylene beaker which holds ½ liter. The blade diameter of the propeller was 50 millimeters; the speed of rotation was 5000 r.p.m. The suspension was then transferred to a 100 milliliter measuring cylinder and allowed to stand. Less than 1 milliliter of sediment formed after 60 minutes.

EXAMPLE 3(b)

A silica obtained according to Example 1 was ground in a micronizer type mill with air. The pressure of the air for grinding was 8 atmospheres excess pressure. The temperatures were 25° C. The obtained silica was suspended as previously described. It formed 2.5 liter sediment after 60 minutes.

EXAMPLE 3(c)

5 grams of a silica which was produced according to Example 1 and was ground with an Alpine disk attrition mill were suspended as previously described. After 60 minutes, it formed about 20 milliliters of sediment.

The silica ground with a gas or steam jet mill shows a much lesser tendency to form a sediment as compared to silica ground in the traditional way.

We claim:

1. In a process for producing finely-divided silica having a large specific surface area, low iron content, slight sedimentation and low viscosity in an aqueous suspension including the step of mixing water glass with mineral acid to form a silica preciptate in said mixture, the improvement comprising maintaining the pH of said mixture at pH values of below about 5 during the precipitation and forming said silica precipitate in the presence within said mixture of a combination of a water soluble inorganic fluorine compound and an organic compound selected from the group consisting of tartaric acid, citric acid, oxalic acid, glycerine, ethylene glycol and ethylene diamine tetra-acetic acid sodium which combination forms soluble complex compounds with iron.

2. The process of claim 1 wherein the precipitate is ground.

3. The process of claim 1 in which the pH value of the precipitation is conducted at a pH between about 1.5 and about 2.5.

4. The process of claim 1 wherein the combination of sodium fluoride and oxalic acid is used as the complexing substance for the formation of soluble iron complexes.

5. The process of claim 1 wherein the fluorine compound is selected from the group consisting of hydrofluoric acid and sodium fluoride.

References Cited

UNITED STATES PATENTS 2,280,649   4/1942   Kanhofer _____ 252—451

JAMES E. POER, *Primary Examiner.*

U.S. Cl. X.R.

96—75, 85; 106—288; 117—155, 156; 162—135